United States Patent [19]

Johnson

[11] 3,877,743
[45] Apr. 15, 1975

[54] FLUID OPERATED GRAPPLE
[76] Inventor: Norman Allen Johnson, 5325 Tenth Ave., South Delta, British Columbia, Canada
[22] Filed: June 25, 1973
[21] Appl. No.: 372,973

[52] U.S. Cl. .............. 294/88; 214/147 G; 294/106
[51] Int. Cl. ............................................. B66c 3/16
[58] Field of Search .............. 294/70, 88, 106, 118; 37/183 R, 184–188; 214/147 G

[56] References Cited
UNITED STATES PATENTS

| | | | |
|---|---|---|---|
| 2,788,143 | 4/1957 | Tendresse | 214/147 G |
| 3,384,409 | 5/1968 | Guinot | 294/88 |
| 3,413,029 | 11/1968 | Donovan | 294/88 X |
| 3,620,394 | 11/1971 | Symons et al. | 294/106 X |
| 3,722,706 | 3/1973 | Blonsky | 294/88 X |

Primary Examiner—Evon C. Blunk
Assistant Examiner—Johnny D. Cherry

[57] ABSTRACT

This disclosure pertains to novel improvements in the structure of fluid operated grapples. A grapple assembly comprises a pair of jaws pivotally interconnected to a swivel head and a pair of fluid operated linear actuators pivotally interconnected to the swivel head and the jaws. The swivel head comprises a spindle portion rotatably mounted in a housing portion by upper and lower thrust bearings, the thrust bearings themselves being operatively mounted in upper and lower bearing chambers. A grapple-closing fluid source is duct-connected through the spindle portion to the lower bearing chamber and a grapple opening fluid source is duct-connected similarly to the upper bearing chamber. The extension ports of the linear actuators are duct-connected to the lower bearing chamber and the retraction ports are duct-connected to the upper bearing chamber. Fluid pressure in the lower bearing chamber imparts an upward thrust on the housing when the grapple jaws are closed or loaded and pressure in the upper bearing chamber provides a downward thrust on the housing when the grapple is open.

5 Claims, 6 Drawing Figures

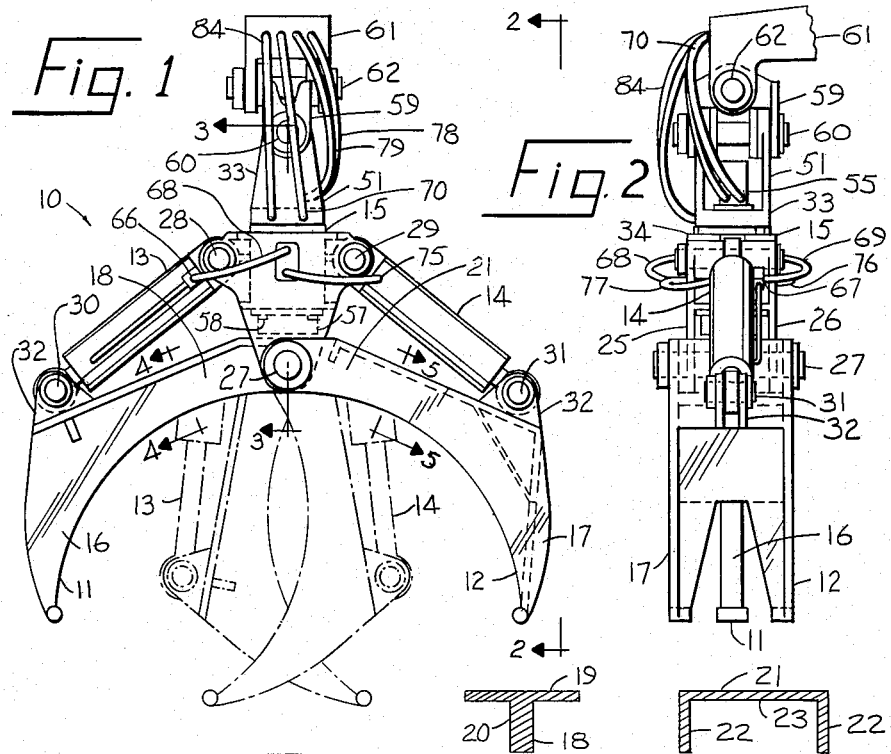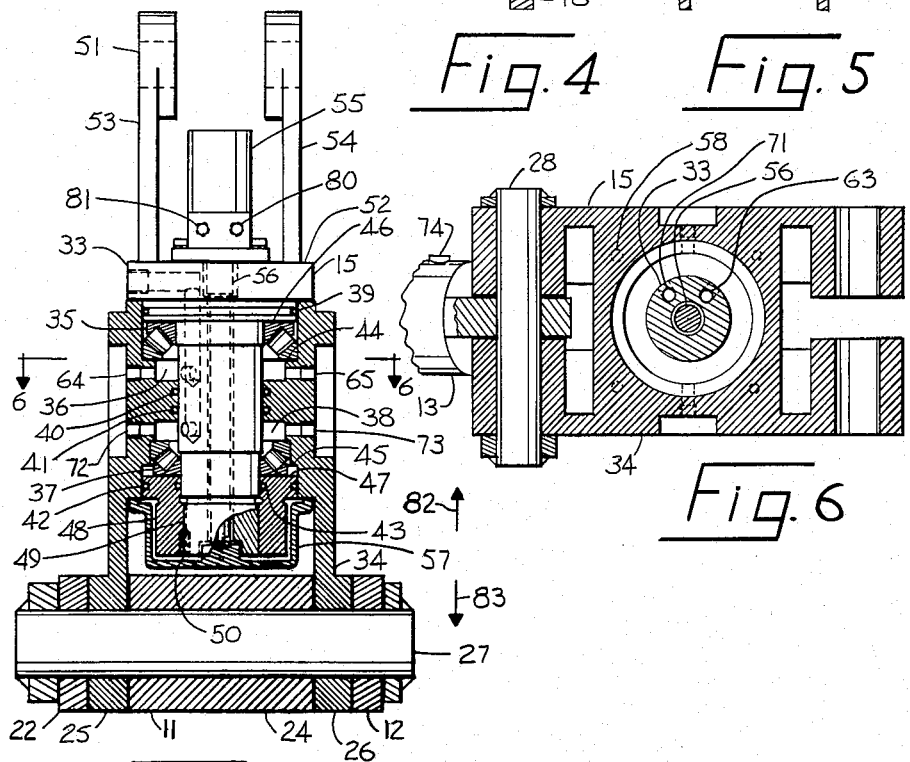

FLUID OPERATED GRAPPLE

This invention relates to novel improvements in devices which are known in the art to which they pertain as fluid operated grapples, or to devices such as clamshell buckets and tongs which belong to or are of the general character of grapples. Specifically, this invention relates to fluid operated tongs which, in their simplest form, comprise a pair of jaws, a pair of linear actuators, and a lifting head to which the jaws and linear actuators are pivotally interconnected.

In the logging industry, grapples are widely used in the yarding, skidding, and loading of logs. Hydraulically operated loading and skidding grapples are finding increasing use due to the short time it takes an operator to learn how to operate them. Principle requirements of hydraulic loading and skidding grapples include adequate holding power, rugged construction, protection of hydraulic components, and a capacity to swivel the grapple at will with respect to a manipulating boom. Continuous swiveling in either direction is preferred over partial swivelling. Adequate thrust bearing capacity in the swivelling appartus must be provided for both lifting a grappled load and for forcing the grapple downward or digging into a pile of logs.

My invention includes novel swivel structure which serves as a reversible and continuously rotatable rotary union for transmitting fluid from a manipulating boom through thrust bearing chambers of the swivel structure to the grapple operating linear actuators. Fluid pressure in the thrust bearing chambers imparts thrust forces as between spindle and housing portions of the swivel structure and the presence of fluid in the bearing chambers provides lubrication to thrust bearings therein. Further, the extension ports of the linear actuators are duct-connected to the bearing chamber which provides a lifting thrust to the housing and the retraction ports are duct-connected to the bearing chamber which provides a digging thrust to the housing. Finally, axial movement of the spindle portion with respect to the housing portion may be provided whereby fluid in the bearing chambers self-energizes the grapple operating linear actuators during lifting or digging.

Accordingly, it is one object of this invention to provide an improved fluid operated grapple assembly especially adapted for log loading and skidding wherein the grapple jaws may be reversibly and continuously rotated with respect to a grapple manipulating boom.

It is a further object of this invention to provide a fluid operated grapple assembly in which swivel thrust bearing chambers provide a rotary union for transmitting fluid from a grapple manipulating boom to grapple operating linear actuators.

It is still another object of this invention to provide a fluid operated grapple swivel assembly in which swivel thrust bearings are lubricated by the fluid transmitted to and from grapple operating linear actuators.

Yet another object of this invention is to provide a fluid operated grapple swivel assembly in which lifting and digging thrusts are imparted to the grapple assembly by the fluid respectively closing and opening the grapple jaws.

A further object of my invention is to provide a swivel structure wherein a spindle portion is axially movable within a housing portion whereby fluid pressure in thrust bearing chambers self-energizes the fluid in the grapple operating linear actuators.

Still another object of this invention is to provide jaw structure which combines adequate strength, protection to the grapple operating linear actuators, and facilitates interconnection with a swivel assembly.

These and still further objects and advantages of the present invention reside in the details of construction of a preferred embodiment disclosed herein and will be evident to one skilled in the art from a study of the specification and the accompanying drawings. Therefore the preferred embodiment disclosed is merely exemplary and is not intended to detract from the full scope of the invention as set out in the annexed claims.

In the drawings, wherein like numerals refer to like parts:

FIG. 1 is an elevation of my invention wherein the grapple jaws are shown in the open position in solid lines and in the close position in broken lines;

FIG. 2 is a side view of my invention with the grapple jaws open taken substantially along line 2—2 in FIG. 1;

FIG. 3 is a partial sectional view of the swivel structure of my invention taken substantially along line 3—3 in FIG. 1;

FIG. 4 is a sectional view of one jaw of my invention taken along line 4—4 in FIG. 1;

FIG. 5 is a sectional view of my invention taken along line 5—5 in FIG. 1;

FIG. 6 is a partial sectional view of my invention taken substantially along line 6—6 in FIG. 3.

Referring now to the drawing, FIGS. 1 and 2 illustrate two views of a preferred embodiment of my present invention as comprising fluid operated grapple assembly 10 having a pair of jaws 11 and 12, a pair of fluid operated linear actuators 13 and 14, and swivel head means 15. Jaws 11 and 12 have lower end portions 16 and 17, respectively, shaped and adapted for gathering, holding, and lifting logs. Upper end-portion 18 of jaw 11 is constructed in the form of a tee cross-section, as illustrated in FIG. 4, having cross-bar portion 19 and stem portion 20. Upper end-portion 21 of jaw 12 is constructed in the form of a channel cross-section, as illustrated in FIG. 5, having legs 22 and web 23. It will be evident to one skilled in this art that the upper end-portion cross-sections of jaws 11 and 12 may be constructed of substantially the same mass, strength and ruggedness while the width of cross-bar 19 and web 23 offer a degree of protection to actuators 13 and 14 from objects grappled in jaws 11 and 12. Further, upper end-portion 18 is readily terminated in boss 24 mounted pivotally between head brackets 25 and 26 and legs 22 of upper end-portion 21 are readily mounted pivotally outside brackets 25 and 26 on jaw pin means 27. Linear actuators 13 and 14 are pivotally interconnected at one end to swivel head means 15 by pin means 28 and 29, and to jaws 11 and 12 intermediate their upper and lower end-portions by a pair of bracket members 32, secured to cross-bar 19 and to web 23, and pin means 30 and 31.

FIGS. 3 and 6 illustrate the structure of swivel head means 15 as comprising spindle means 33 rotatably mounted in housing means 34. upper thrust bearing means 35 is operatively mounted in upper bearing chamber 36 and lower thrust bearing means 37 is operatively mounted in lower bearing chamber 38. Upper bearing chamber 36 is defined axially by sealing means 39 and 40 and lower bearing chamber 37 is defined axially by sealing means 41, 42, and 43. Housing 34 includes a pair of shoulder means 44 and 45 and spindle 33 includes a pair of shoulder means 46 and 47; bearing 35 is secured axially between shoulders 44 and 46 and bearing 37 is secured axially between shoulders 45 and 47. Shoulder means 47 forms a part of nut 48 threadably mounted on end 49 of spindle 33 and rotatably locked by set-screw 50.

Spindle 33 includes clevis portion 51 comprising plate 52 and brackets 53 and 54. Mounted on plate 52 is rotary actuator 55 having its output shaft operatively connected to swivel shaft 56 and cover 57. Cover 57 is secured to housing 34 by bolts 58 whereby rotation of shaft 56 by actuator 55, with respect to spindle 33, causes grapple housing 34 and jaws 11 and 12 to rotate with respect to spindle 33. Brackets 53 and 54 are pivotally interconnected to cross-swivel piece 59 by pin means 60 and piece 59 is pivotally interconnected to manipulating boom means 61 by pin means 62. It will be evident that spindle 33 is not rotatable about a substantially vertical axis with respect to boom 61.

Operating fluid for opening, closing, and rotating grapple assembly 10 originates at and returns to a power source at the machine upon which boom 61 is mounted. Controlled grapple-opening fluid flows through hose 84 and duct 63 into bearing chambers 36, through ports 64 and 65 respectively, and into retraction ports 66 and 67 of actuators 13 and 14, respectively, by means of hoses 68 and 69. Controlled swivelling fluid flows through hose 70 and duct 71, into bearing chambers 38, through ports 72 and 73, and into extension ports 74 and 75 of actuators 13 and 14, respectively, by means of hoses 76 nad 77. Controlled swivelling fluid flows into and out of actuator 55 by means of hoses 78 and 79 and actuator ports 80 and 81.

It will be evident to one skilled in these arts that, where bearings 35 and 37 are anti-friction roller bearings adapted to accepting radial loads as well as thrust loads, nut 48 should pre-load such bearings to ensure alignment. However, where bearings 35 and 37 are spring loaded, plate, ball, or roller bearings adapted for pure thrust, nut 48 may be fixed to spindle 33 whereby a measure of axial movement of spindle 33 with respect to housing 34 is permitted. In this latter case, it will be clear that fluid pressure in upper bearing chamber 36 causes spindle 33 to move in direction 82 with respect to housing 34 until shoulder 47 contacts shoulder 45; conversely, fluid pressure in lower bearing chamber 38 causes spindle 33 to move in direction 83 with respect to housing 34 until shoulder 46 contacts shoulder 44. Hence, when fluid is passed through lower chamber 38 to close grapple jaws 11 and 12 about a log, the pressure in chamber 38 will always be greater than or equal to a self-energizing pressure which is dependent upon the opposing functional areas of shoulders 45 and 47 and the load in the grapple jaws. Moreover, if shoulders 45 and 47 do not make contact, the fluid in chamber 38 will serve as a thrust bearing.

It will be appreciated that the foregoing discloses only a preferred embodiment of my present invention. Further, many changes, modifications, and equivalents will readily occur to one skilled in the art, particularly in view of the above teachings. Therefore, the present invention is not to be construed as limited to the specific details illustrated and described above.

The embodiments of the invention in which an exclusive property or privilege is claimed are defined as follows:

1. A fluid operated grapple assembly comprising a swivel head means having a spindle means rotatably mounted in a housing means, said spindle means secured axially in said housing by upper and lower thrust bearing means, said upper and lower thrust bearing means operatively mounted respectively in upper and lower bearing chambers, said upper and lower thrust bearing means including respectively upper and lower anti-friction bearing assemblies having inner and outer races, said outer races operatively mounted in said housing means outboard a pair of housing shoulder means, said inner races operatively mounted on said spindle means inboard a pair of spindle shoulder means, one of said spindle shoulder means axially adjustable on said spindle means, a pair of jaws each having upper and lower end-portions, said upper end-portions pivotally connected to said housing means, a pair of fluid operated linear actuators each having an extension and a retraction fluid port and being pivotally connected at one end to said housing and at the other end to one of said jaws intermediate said upper and lower end-portions, each of said extension fluid ports duct-connected to one of said bearing chambers and each of said retraction fluid ports duct-connected to the other of said bearing chambers, one of said bearing chambers duct-connected through said spindle means to a controlled grapple-closing fluid source and the other of said bearing chambers duct-connected through said spindle means to a controlled grapple-opening fluid source, extension of said pair of linear actuators closing and retraction thereof opening said grapple assembly.

2. A fluid operated grapple assembly as defined in claim 1 wherein said swivel head means includes a rotary actuator having a base secured to said spindle means and having an output shaft operatively connected to said housing means.

3. A fluid operated grapple assembly as defined in claim 1 wherein each of said extension fluid ports is duct connected to said lower bearing chamber and each of said retraction fluid ports is duct connected to said upper bearing chamber, said lower bearing chamber duct connected to said grapple-closing fluid source and said upper bearing chamber duct-connected to said grapple opening fluid source.

4. A fluid operated grapple assembly as defined in claim 1 wherein fluid from said grapple-closing fluid source lubricates said lower thrust bearing means and fluid from said grapple-opening fluid source lubricated said upper thrust bearing means.

5. A fluid operated grapple assembly comprising a swivel head having a spindle rotatably mounted in a housing, said spindle secured axially in said housing by upper and lower thrust bearings, said upper and lower thrust bearings operatively mounted respectively in upper and lower bearing chambers, said upper and lower thrust bearings including a pair of housing shoulder means and a pair of spindle shoulder means, the axial distance between said spindle shoulder means substantially greater than the axial distance between said housing shoulder means, a pair of jaws each having upper and lower end-portions, said upper end-portions pivotally connected to said housing, a pair of fluid operated linear actuators each having an extension and a retraction fluid port and being pivotally connected at one end to said housing and at the other end to one of said jaws intermediate said upper and lower end-portions, each of said extension fluid ports duct-connected to said lower bearing chamber and each of said retraction fluid ports duct-connected to said upper bearing chamber, said lower bearing chamber duct-connected through said spindle to a controlled grapple-closing fluid source and said upper bearing chamber duct-connected through said spindle to a controlled grapple-opening fluid source, a rotary actuator operatively mounted on said spindle and interconnected to said housing, extension of said pair of linear actuators closing and retraction thereof opening said grapple assembly and actuation of said rotary actuator rotating said grapple assembly with respect to said spindle.

* * * * *